United States Patent [19]

Weaver et al.

[11] Patent Number: 5,068,076

[45] Date of Patent: * Nov. 26, 1991

[54] METHOD OF FORMING AN ENCAPSULATED GLAZING UNIT

[75] Inventors: William R. Weaver; James E. Matzinger, both of Toledo, Ohio

[73] Assignee: Libbey-Owens-Ford Co., Toledo, Ohio

[*] Notice: The portion of the term of this patent subsequent to May 16, 2006 has been disclaimed.

[21] Appl. No.: 225,729

[22] Filed: Jul. 28, 1988

[51] Int. Cl.$^5$ .............................................. B29C 45/14
[52] U.S. Cl. .................................... 264/511; 264/139; 264/252; 264/263; 264/265; 264/266
[58] Field of Search ............... 264/139, 252, 255, 259, 264/263, 265, 266, 511; 296/93; 52/204, 205, 397

[56] References Cited

U.S. PATENT DOCUMENTS

| 4,072,340 | 2/1978 | Morgan | 296/201 |
| 4,250,612 | 2/1981 | Narita | 29/527.1 |
| 4,369,157 | 1/1983 | Conner | 264/266 |
| 4,561,625 | 12/1985 | Weaver | 264/252 |
| 4,695,420 | 9/1987 | Grawey | 264/252 |
| 4,830,804 | 5/1989 | Weaver | 264/263 |

FOREIGN PATENT DOCUMENTS

| 2525143 | 10/1983 | France | 264/266 |
| 53-139664 | 12/1978 | Japan | 264/266 |
| 55-94812 | 7/1980 | Japan | 296/93 |

Primary Examiner—Jan H. Silbaugh
Assistant Examiner—Brian J. Eastley
Attorney, Agent, or Firm—Marshall & Melhorn

[57] ABSTRACT

Producing an encapsulated glazing unit having a weather-stable film on an exposed surface of the gasket. There is provided a two-part mold whose sections cooperate to define a mold cavity for receiving the peripheral margins of the transparent glazing unit upon which the gasket is to be formed. A sheet of the weather-stable film is positioned over the mold section having the portion of the cavity which defines the surface to which the film is to be applied. With the mold closed, a flowable gasket forming material is injected into the mold cavity behind the film to deform the film into conformity with the mold surface. As the gasket cures in situ, the film fuses to its surface. The encapsulated unit is removed from the mold and the excess film is trimmed from around the gasket.

7 Claims, 3 Drawing Sheets

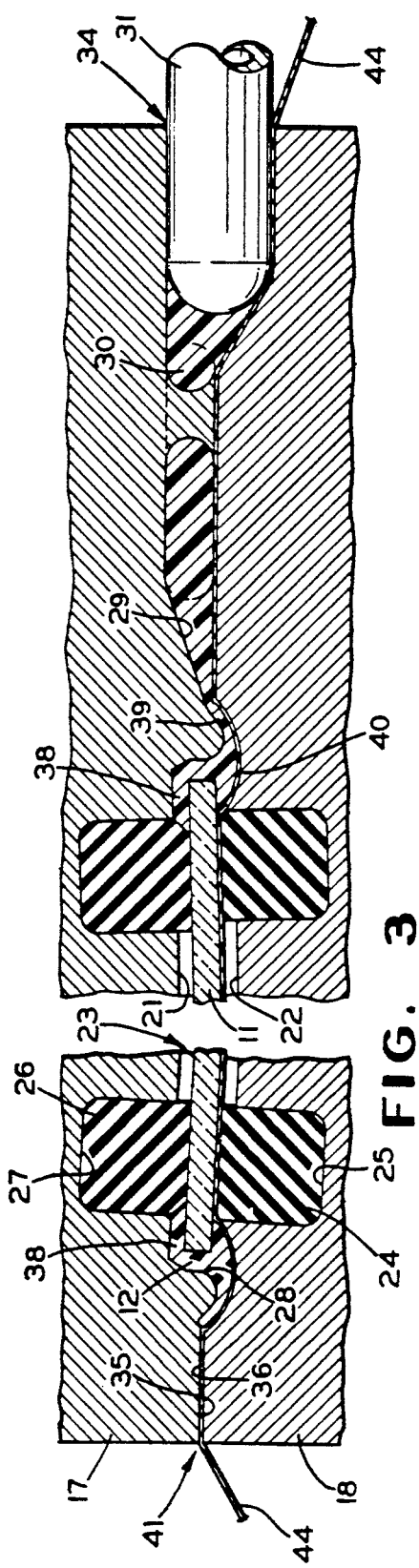
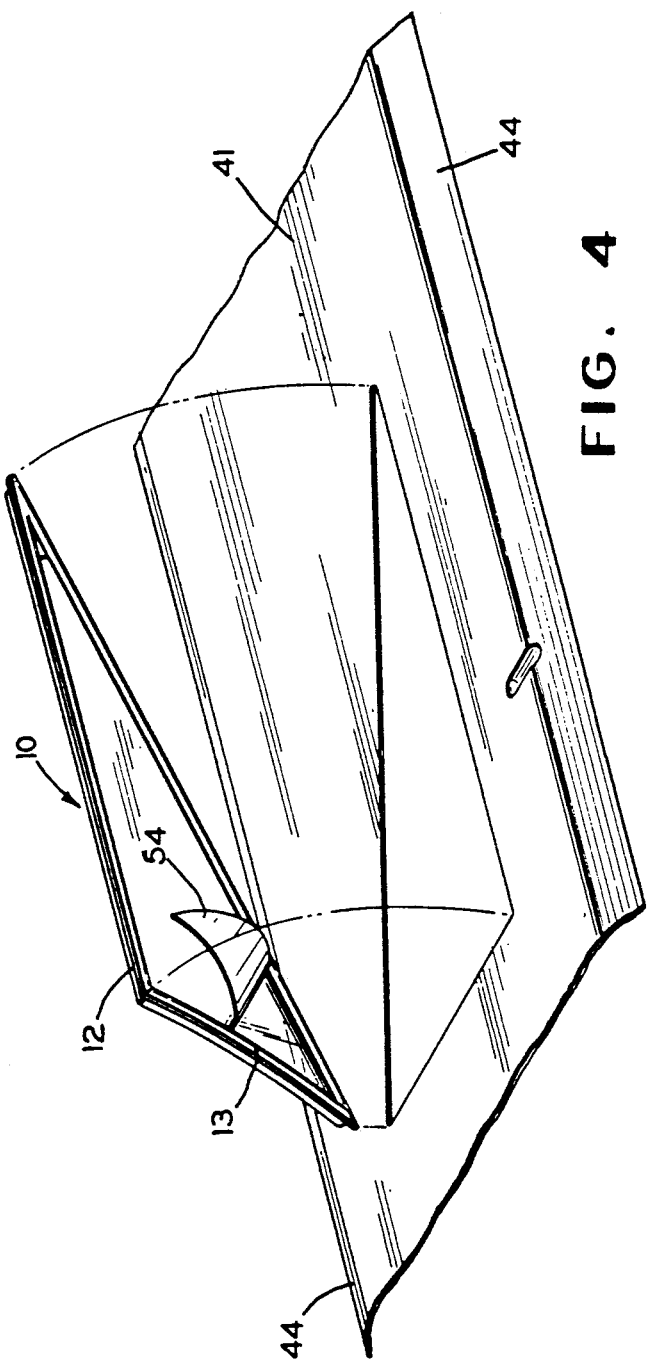

METHOD OF FORMING AN ENCAPSULATED GLAZING UNIT

BACKGROUND OF THE INVENTION

The present invention pertains generally to the production of an encapsulated window assembly, and more particularly to a method of and apparatus for molding a suitable film onto a surface of the encapsulating polymer molding during formation of the molding by the reaction injection molding process.

For many years automotive vehicle windows were installed utilizing suitable mechanical fasteners such as metal clips, with adhesive sealants applied around the margin of edges of the glass unit, and exterior decorative trim strips disposed to cover the junction between the original edges of the glass sheet and the adjacent portions of the vehicle body and present a pleasing appearance. Assembly procedures for such window structures required a great deal of labor inasmuch as it was necessary to manually assemble the individual components as the vehicle moved along the assembly line. As labor rates increased, the cost thus became increasingly burdensome.

In an effort to improve the seal around the window, as well as to reduce the amount of labor required for installation, unitary window assemblies such as those illustrated in U.S. Pat. No. 4,072,340 were developed. Such assemblies comprise a sheet of glass or a laminated glass unit surrounded by a preformed casing or gasket of molded material such as polyvinyl chloride for insertion in an adjacent frame. The casing or gasket extends between the frame and the peripheral edge of the window to secure the window within the opening. Fasteners are provided on the frame so that the entire assembly can be guided into location within the opening in the vehicle body as a unit. Such window structures effectively reduce the time required to mount the window assembly in the vehicle, but they are still relatively costly since the individual components comprising each window assembly must be manually assembled.

More recently as disclosed, for example, in U.S. Pat. No. 4,561,625, so-called encapsulated automotive glazing units have been developed wherein a gasket is formed around at least a predetermined portion of a glazing unit of transparent material such as glass. The glazing unit may comprise a single sheet of glass as used in automotive side lights or backlights, or a laminated unit as employed for windshields. Such gaskets are generally formed by curing a polymeric gasket forming material in situ on the glazing unit to encapsulate the marginal peripheral edge portion of the unit. The gasket is typically formed by a reaction injection molding, or so-called RIM encapsulating process. Fabrication of such encapsulated glazing units is disclosed, in the aforementioned U.S. Pat. No. 4,561,625, the disclosure of which is incorporated herein by reference. The encapsulated unit can then be readily mounted in an appropriately shaped opening in a vehicle body without further manual assembly of additional components.

Encapsulated units require a minimum of manual labor in their fabrication and installation. The material utilized in forming the gasket around the unit by the reaction injection molding process is generally a flowable polymeric material which can be cured in situ on the glass sheet. Such materials may be susceptible to degradation upon extended exposure to the elements, particularly the effects of ultraviolet radiation resulting from prolonged exposure to sunlight. In order to minimize the possible deleterious effects of such exposure, it has been deemed advisable to provide the surfaces of the molding which are to be exposed to the elements, particularly those which will be exposed to sunlight, with a protective coating. To that end, exposed surfaces of encapsulated units have heretofore been coated with a weather-stable paint which protects the polymer material from the effects of ultraviolet radiation. Such painting of the surfaces of the encapsulated parts following molding of the gaskets involves substantial costs in labor, materials and equipment. Thus, there has been a recognized need for a system to replace the post-painting of encapsulated parts.

SUMMARY OF THE INVENTION

The present invention pertains to the production of a transparent glazing unit having a polymer gasket molded in situ around at least a portion of the perimeter thereof, with a weather-stable film molded onto the exposed surface of the polymer gasket during the reaction injection molding process by which the encapsulation unit is fabricated. More particularly, there is provided a two part mold whose sections cooperate to define a mold cavity for receiving the peripheral margins of the transparent glazing unit upon which the gasket is to be formed. Inlet means or gates are provided for introducing a flowable gasket forming material into the mold cavity.

Provision is made for drawing a sheet of the weather-stable film over the mold section having the portion of the mold cavity which defines the gasket surface to which the film is to be applied. The glazing unit is positioned within the mold over the film, and the mold sections are brought together or closed so as to define the mold cavity. The gasket forming material is introduced over the film to fill the mold cavity and form the film to the configuration of the cavity in the associated mold section. As the gasket cures, the film fuses to its surface to become an integral part of the gasket. Upon completion of gasket formation, the mold sections are separated and the encapsulated unit having the weather-stable film thereon is removed. Excess film material is trimmed from around the gasket, and the completed encapsulated unit is ready for installation in a vehicle.

The film material, while drawn over the mold, is generally sufficiently resilient and stretchable to be formed to the configuration of the mold cavity by injecting of the polymer material therebehind. However, it is contemplated that heated air may be admitted to the mold cavity prior to injection of the polymer compound to condition the film material, and that vacuum means may be provided for assistance in drawing the film into conformity with the surface of the mold cavity during injection of the polymer compound. Both of these "assists" also eliminate the possibility of the film wrinkling if a tendency towards same exists. Then too, the mold itself may be heated to an elevated temperature, for example to both aid in conditioning the film material and cure of the polymer gasket composition.

BRIEF DESCRIPTION OF THE DRAWINGS

The above, as well as other advantages of the present invention, will be readily apparent to those skilled in the art from the following detailed description of a preferred embodiment when considered in the light of the accompanying drawings, in which:

FIG. 3 is an enlarged, fragmentary, sectional view of the mold structure illustrating the position of the film within the mold upon formation of the gasket;

FIG. 4 is a perspective view illustrating separation of the encapsulated assembly of FIG. 1 from the film sheet, and removal of the film from the interior of the unit, to leave the film transfer on the gasket;

DETAILED DESCRIPTION OF THE PREFERRED EMBODIMENT

Figure 1:
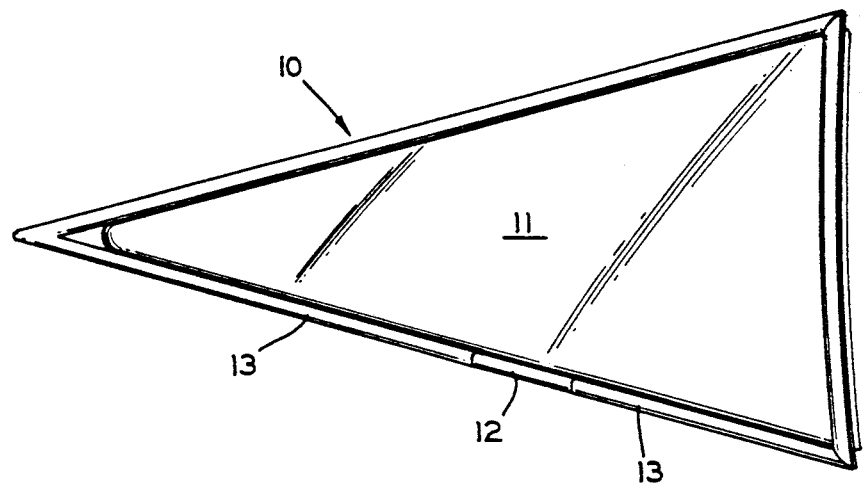
FIG. 1 is a perspective view of an encapsulated rear quarter window assembly for an automobile embodying the invention.

Referring now to the drawings, and in particular to FIG. 1, there is shown generally at 10 an encapsulated glazing unit embodying the invention and suitable for installation in an automotive vehicle as a rear quarter lite, for example. It will be readily appreciated that the glazing unit may as well be of a shape suitable for installation as a windshield, rear window, side lite or roof panel, as well as for various other types of glazing closures. More specifically, the unit 10 comprises a transparent sheet 11 as of glass which may be monolithic, laminated, coated, spaced multiple sheet, flat or curved, as the case may be, having a gasket 12 molded in situ around at least a portion of its peripheral margin. There is molded on the external or outwardly facing surface of the gasket a weather-stable film 13, shown partly broken away in FIG. 1.

As hereinbefore explained, the film is preferably applied in conjunction with formation of the encapsulating gasket as by a film transfer molding process. To that and, there is shown generally at 14 in FIG. 2 one form of apparatus constructed in accordance with the invention for fabricating the encapsulated units 10. The apparatus includes a mold 15 for forming the gasket 12 about the periphery of the sheet 11 and a web or film transport mechanism 16 for providing a continuous sheet of film for periodic advancement through and across the mold. The mold is comprised of cooperating upper or first and lower or second sections 17 and 18, respectively, including means for suitably opening and closing the mold sections. The lower mold section may, for example, be stationarily mounted upon a base 19 while the upper section 17 is mounted for reciprocating movement toward and away from the lower section as by a cylinder 20.

As shown in FIG. 3, the mold sections 17 and 18 are provided with centrally disposed recessed portions 21 and 22, respectively, in facing relationship to one another such that, when the mold sections are closed, the recessed portions 21 and 22 cooperate to define a sheet receiving chamber 23 for receiving the transparent sheet 11 on which a gasket is to be formed. To that end, the mold sections 17 and 18 are designed so that the outer peripheral portion of the lower surface of the sheet rests on a resilient lower seal 24 positioned within a groove 25 formed in the upper surface of the lower section 18. The upper mold section 17 carries a corresponding resilient upper seal 26 positioned in a groove 27 formed opposite the groove 25. The upper seal 26 thus cooperates with the lower seal 24 to press yieldingly against the sheet 11 and resiliently support the sheet within the sheet receiving chamber 23.

In addition to their function in resiliently supporting the sheet 11 within the chamber 23, the seals 24 and 26 cooperate with the peripheral margins of the sheet and the mold sections 17 and 18 to define a gasket-forming cavity 28 for forming the gasket 12 on the sheet. The cavity 28 communicates with an inlet means or gate 29 and associated mixing head or chamber 30 for receiving a flowable polymeric gasket forming material as from a nozzle member 31. Corresponding depressions 32 and 33 within upper and lower mold sections 17 and 18, respectively, define a port 34 for receiving the nozzle member in communication with the mixing head 30 when the mold is closed. The gasket forming material is adapted to polymerize and cure in situ on the peripheral margin of the sheet 11 to form the gasket 12. The mold sections 17 and 18 include surfaces 35 and 36, respectively, which face one another outwardly of the gasket-forming cavity to define a parting line 37. As hereinbefore indicated, the gasket may advantageously be formed by a reaction injection molding process.

The gasket forming cavity 28 is of a cross-sectional configuration to produce a gasket 12 which will both facilitate installation of the glazing unit in a vehicle body and present a pleasing finished appearance when installed. To that end, the gasket 12 may comprise a channel-shaped section 38 encompassing the peripheral edge of the transparent sheet, and a flange 39 extending from one side of the channel-shaped member so as to present a curved surface 40 to which the film is applied.

In accordance with the invention, the weather-stable film 13 is applied to the surface 40 of the gasket 12 by drawing a web 41 of the film material over the lower mold section 18, and then placing the sheet 11 in the sheet receiving chamber 23 over the web. After closing the mold, the gasket forming material is injected behind the web of film material to press the film into conformity with and fill the cavity 28, thereby forming the gasket 12. A number of suitable materials, such as films of polyvinyl chloride, acrylic, polyethylene and polyvinyl fluoride, on the order of 0.5 to 15 mils in thickness, are commercially available, with the heavier films providing a particularly desirable surface finish as well as a weather stable, e.g., ultraviolet radiation barrier, layer. Good results have been obtained with a polyvinyl fluoride sold by E. I. duPont de Nemours and Company (Wilmington, Del.) under the name TEDLAR ® and an acrylic sold by Polymer Extruded Products (Newark, N.J.) under the name KORAD ®. A preferred material is a 3 to 4 mil thick film of polyvinyl chloride. In some cases it is beneficial to treat the film to provide reactive sites thereon and thus improve adhesion to the gasket polymer. The use of corona discharge or silane primers are examples of treatments in this regard.

Figure 2:
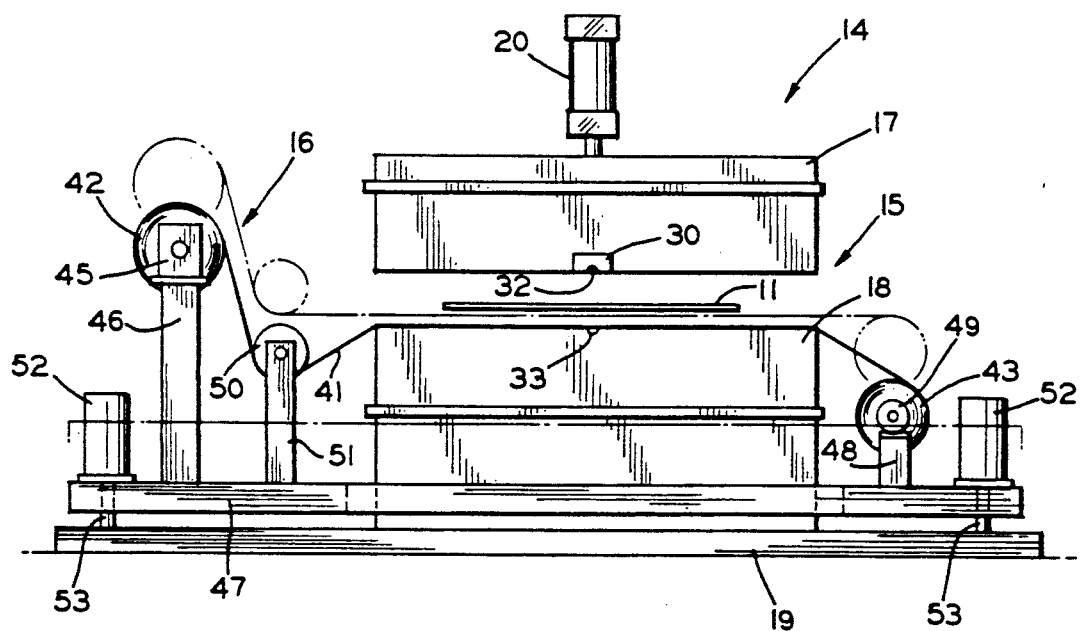
FIG. 2 is a side elevational view of one embodiment of the apparatus of the invention.

In order to properly position the web between the upper and lower mold sections and provide for periodic advancement of the web following each molding cycle, the web transport mechanism 16, as best seen in FIG. 2, includes a supply roll 42 of the film material mounted at one end of the mold 15. A take up reel 43 is provided at the opposite end of the mold for drawing the web 41 of film material through the mold and accumulating the salvage film material following each molding cycle. The web may be somewhat wider than the mold 15 so that marginal edge portions 44 project beyond the mold sections 17 and 18 as shown in FIG. 3 to assist in maintaining the width of the web as the mold is closed. It is necessary that the web 41 of film material be maintained in a taut, wrinkle-free condition as it extends through the mold in order to produce a smooth film coating 13 of pleasing appearance on the gasket.

Thus, the supply roll 42 is journalled and supported at its ends in tension brake mechanisms 45 mounted upon stands 46 carried by a vertically reciprocable platform 47. The take-up reel 43 is mounted in journals upon pedestals 48 likewise carried by the platform 47. A motor 49 is provided for driving the take-up reel to periodically withdraw the web 41 from the supply roll 42 and across the mold 15 against the retarding effect of the brake mechanism 45. In order to prevent it from narrowing, the web 41 passes beneath a width maintenance or spreader roll 50 journalled to rotate freely on stands 51 on the platform 47. As will be hereinafter more fully described the platform, and the web transport mechanism 16 thereon, is adapted to move between the lowered, molding position illustrated in solid lines and the elevated position as illustrated in broken lines, for advancement of the web 41. Raising and lowering may be accomplished by means of cylinders 52 affixed to the platform, with their extensible piston rods 53 extending through the platform to the stationary base 19.

Briefly reviewing operation of the preferred embodiment, with the mold 15 in the open position the platform 47 is raised from the solid to the broken line position as illustrated in FIG. 2. The take-up reel 43 is driven by the motor 49 to withdraw the web 41 from the supply roll 42 against the braking action of the mechanism 45 so as to be maintained in a taut, wrinkle-free condition. As will be noted in FIG. 2, the spreader roll 50 and the take-up reel 43 will be at such an elevation that the web 41 extending therebetween assumes a position slightly above the surface 36 of the lower mold section 18. When the web has advanced sufficiently, the platform 47 is lowered to the solid line position so that the web 41 is deposited on the surface 36 of the lower mold section 18. The film material comprising the web is sufficiently resilient to stretch over the mold between the spreader roll 50 and the take-up reel 43 and further preclude wrinkling.

A transparent sheet 11 is positioned in the sheet receiving chamber 23 on the web 41, and the mold is closed by lowering the upper mold section 17 to bring the surfaces 35 and 36 into engagement along the parting line 37 with the web 41 therebetween. The web 41 of film material will, of course, extend generally linearly across the gasket forming cavity 28 in spaced relation to the curved surface 40. The material is generally sufficiently resilient and stretchable so that upon introduction of the heated, flowable gasket material through the inlet means 29 and mixing chamber 30 from the nozzle 31 along the upper surface of the film material, it will be stretched and depressed into conformity with the curved surface of the mold which defines the curved surface 40 of the gasket 12. As the heated gasket material polymerizes and cures to form the gasket 12, the film material fuses to the surface 40 to form the integral weather-stable film 13 thereon.

Upon completion of the curing cycle and opening of the mold the encapsulated unit 10, as illustrated schematically in FIG. 4, will be encased in the web 41 of film material. The unit is separated from the web as by running a cutting instrument around the outer perimeter of the gasket 12. The web can than be advanced by winding the selvage material upon the take-up reel 43 to ready the apparatus for the next molding cycle. There will remain on the separated unit 10, in addition to the film layer 13 fused to the surface 40 of the gasket 12, an interior cover layer 54 of the film material extending over the transparent sheet 11. The cover layer does not adhere to the transparent sheet, and can be simply and quickly removed by running a cutting tool (not shown) around the inner periphery of the gasket to sever it, and thereafter peeling it away as shown in FIG. 4 to complete fabrication of the encapsulated unit.

Figure 5:
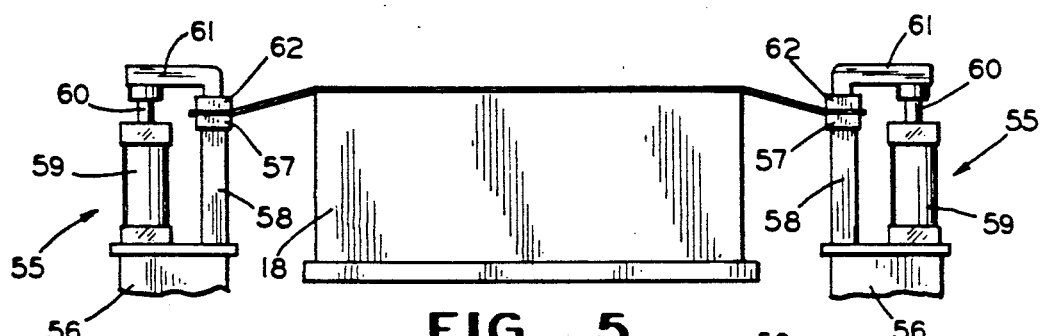
FIG. 5 is an elevational view taken substantially along line 5—5 of FIG. 6.
Figure 6:
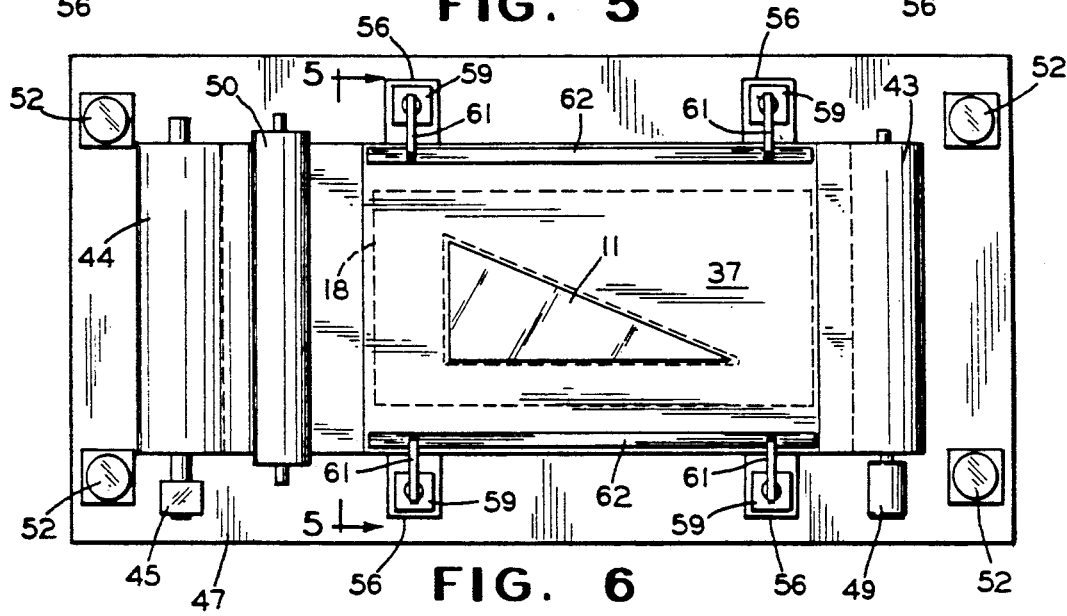
FIG. 6 is a plan view illustrating an alternate embodiment of the invention incorporating side clamps for the film sheet.

As indicated above, in order to apply a film 13 having a pleasing appearance it is important that the web 41 of filming material be wrinkle-free across the gasket-forming cavity 28 as the gasket-forming material is injected. Drawing the web 41 beneath the spreader roll 50 and across the lower mold section, and then lowering the platform 47 to stretch the film as in the embodiment of FIG. 2, will generally avoid such wrinkling. There is shown in FIGS. 5 and 6 an alternate embodiment of the invention for laterally securing and stretching the web in those instances where there may be a greater tendency for the material to wrinkle. Thus, there is provided along either side edge of the mold a securing mechanism 55 for gripping the marginal edges 44 of the web 41. Each such mechanism includes a pair of mounting stands 56 carried by the platform 47 for vertical reciprocating movement therewith. A lower clamping bar 57 extends between the spaced mounting stands beneath the edge of the web 41 and is carried by posts 58 supported on the mounting stands. Also carried by each mounting stand is a cylinder 59 which may, for example, be a conventional air cylinder. The piston rod 60 of each cylinder carries an arm 61 to which is attached one end of a longitudinally extending upper clamping bar 62 disposed above and in cooperating relationship with the lower clamping bar 57.

In operation, with the piston rod 60 extended and the platform 47 elevated to the broken line position of FIG. 2, the web is advanced to a suitable position over the mold with its marginal edges between the spaced lower and upper clamping bars 57 and 62, respectively. The piston rod 60 is retracted to clamp the marginal edges 44 of the web between the clamping bars. The platform 47 is then lowered to the solid line portion of FIG. 2, whereupon the web is stretched laterally across the lower mold section 18 as shown in FIG. 5, as well as longitudinally as shown in FIG. 2.

Figure 7:
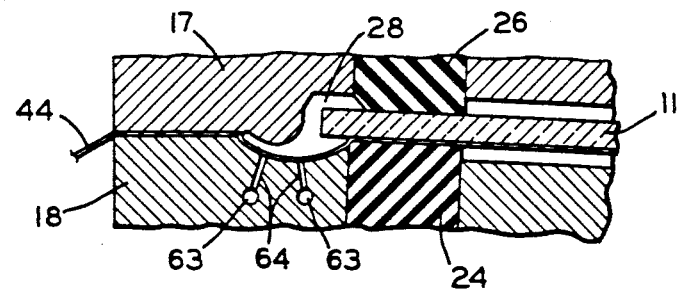
FIG. 7 is an enlarged, fragmentary, sectional view of an alternate embodiment of the mold structure incorporating a vacuum assist system.

For most combinations of weather-stable film and gasket-forming composition, the film will readily conform to the curved surface of the gasket forming cavity upon injection of the gasket-forming material. In instances where it may be desirable to deform the film prior to introduction of the gasket forming composition or to provide assistance in conforming the film to the curved surface, the embodiments of FIGS. 7 and 8 may be utilized. Thus, in the embodiment of FIG. 7 the lower mold section 18 is provided with conduits 63 selectively coupled to a vacuum source (not shown). The conduits, in turn, are in communication with a series of perforations 64 spaced along and opening to the curved surface of the gasket-forming cavity. With the mold closed and the web 41 in place, application of vacuum to the conduits will thus draw the film material against the curved surface prior to or in conjunction with injection of the gasket forming material.

Figure 8:
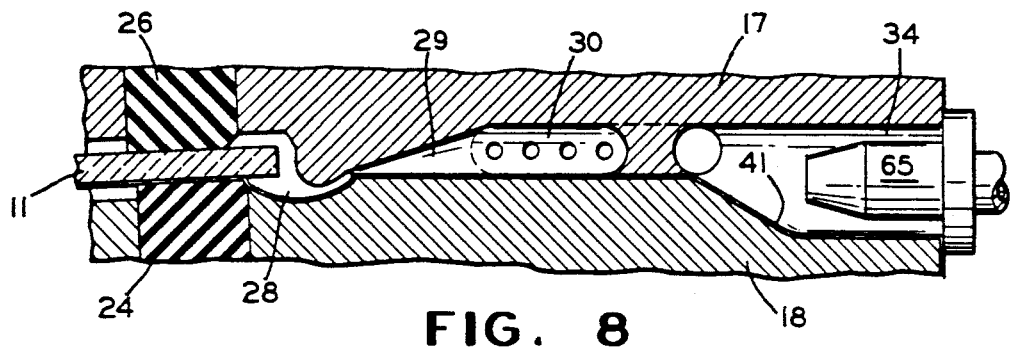
FIG. 8 is an enlarged, fragmentary, sectional view of the mold structure illustrating an arrangement for hot air conditioning of the film prior to injection of the polymer gasket-forming compound.

In the embodiment of FIG. 8 a tubular outlet 65 of a conventional air preheater (not shown) is directed into the port 34 prior to insertion of the nozzle member 31. Suitably heated air is forced under pressure into the gasket forming cavity 28 through the inlet means 29 above the web of film material 41. The film material is thus preheated so as to be more readily deformable, and is urged toward the curved surface of the cavity 28. After a suitable interval, introduction of heated air is discontinued and the flowable gasket-forming material is injected by the nozzle 31 to fill the cavity 28 and complete formation of the film covered gasket.

As will be readily apparent, the invention provides a number of advantages over the post-painting of encapsulated parts as formerly required. Thus, in addition to avoiding the necessity for the extra painting step following fabrication of the encapsulated part, the paint itself is eliminated along with its attendant problems of masking, oven curing, washing and odor and vapor removal. The weather-stable film provides better gloss control, with selection of desired gloss levels, and permits use of multiple colors for the covering. The film prolongs the life of the lower mold seals and provides a protective barrier to the lower mold surface if glass breaks in the mold. Finally, the weather-stable film replaces, i.e. eliminates the need for, the use of a mold release in that half of the mold where the film is employed.

One of the keys to the long term performance of the encapsulated glazing unit according to the invention is the reactive nature of the molded gasket. The RIM process begins with two separate, low viscosity liquid streams. These two liquid streams are injected together into the mold cavity at approximately 1000 psi pressure to ensure good mixing. Each of the liquid components has reactive chemical sites, and after mixing they begin to react with each other and polymerize in the mold cavity.

The reactive chemical sites are a significant factor in achieving the high levels of adhesion between the film material and the RIM gasket or substrate. Chemical groups on the film surface are able to bond, both through actual covalent chemical bonding and non-covalent bonding, with the reactive chemical sites in the RIM substrate. This provides extremely high levels of adhesion even after severe environmental exposure. In some cases, depending upon the film selection, the film may also be treated to enhance the bonding between film and RIM substrate. Corona discharge treatment and silane type primer application are two proven methods to provide enhanced adhesion levels with certain films.

In addition, the very low viscosity and surface tension of the liquid RIM components serves to enhance the film-to-substrate adhesion. This very low viscosity RIM mixture is able to "wet" the film surface much more efficiently than higher viscosity materials (such as injection molded thermoplastics). The wetting and penetration of the liquid into the film surface results in very high levels of adhesive bonding between film and RIM substrate.

It is to be understood that the forms of the invention herewith shown and described are to be taken as illustrative embodiments only of the same, and that various changes in the shape, size and arrangement of parts, as well as various procedural changes, may be resorted to without departing from the spirit of the invention.

What is claimed is:

1. A method of forming an encapsulated glazing unit including a polymeric gasket formed in situ around at least a portion of the periphery of a transparent sheet and a protective coating material chemically bonded to a surface of the gasket, comprising providing a mold including a cavity for forming the gasket on said transparent sheet and which defines the surface of the gasket to which the coating material is to be chemically bonded, disposing a sheet of the coating material across the mold and cavity by withdrawing said sheet of coating material across said mold from a continuous supply at one side of said mold and winding the used sheet of coating material upon a reel at the opposite side following each molding cycle to dispose the sheet of coating material across said mold and cavity, said sheet of coating material being disposed wrinkle-free across said cavity placing the transparent sheet in the mold with one of its major surfaces on said sheet of coating material, injecting a flowable polymeric gasket forming material into said cavity behind said sheet of coating material to fill said cavity and deform said sheet of coating material to conform to the cavity defining said surface of the gasket and polymerizing and curing said gasket forming material in situ to form said gasket on said transparent sheet and simultaneously chemically bond said coating material to the surface of said gasket opening said mold and removing said glazing unit from said sheet of coating material by severing said coating material around the outside of said gasket, and then severing said coating material around the inside of said gasket and removing said coating material covering said transparent sheet.

2. A method of forming an encapsulated glazing unit as claimed in claim 1, including the step of applying tension longitudinally of said sheet of coating material and simultaneously maintaining the width of said sheet of coating material as it is advanced across said mold.

3. A method of forming an encapsulated glazing unit as claimed in claim 1, wherein said continuous supply and reel are positioned to locate said sheet of coating material in a plane above said mold as it is advanced, and then lowered to stretch said sheet across the surface of said mold and cavity.

4. A method of forming an encapsulated glazing unit as claimed in claim 3, including the step of restraining the marginal edges of said sheet of coating material against inward movement as it is lowered.

5. A method of forming an encapsulated glazing unit as claimed in claim 1, including the step of applying a vacuum to said mold cavity between said sheet of coating material and said surface of said cavity which defines the surface to which said coating is to be applied for assistance in conforming said coating material to said surface.

6. A method of forming an encapsulated glazing unit as claimed in claim 1, including the step of introducing heated air into said cavity to preheat said coating material prior to introduction of said gasket forming material.

7. A method of forming an encapsulated glazing unit as claimed in claim 1, wherein the surface of said protective coating material which contacts and chemically bonds with said gasket is first treated to enhance the chemical bonding therebetween.

* * * * *